Sept. 18, 1956  J. P. GLEASON  2,763,778
DELAYED PULSE GENERATOR
Filed Sept. 15, 1955
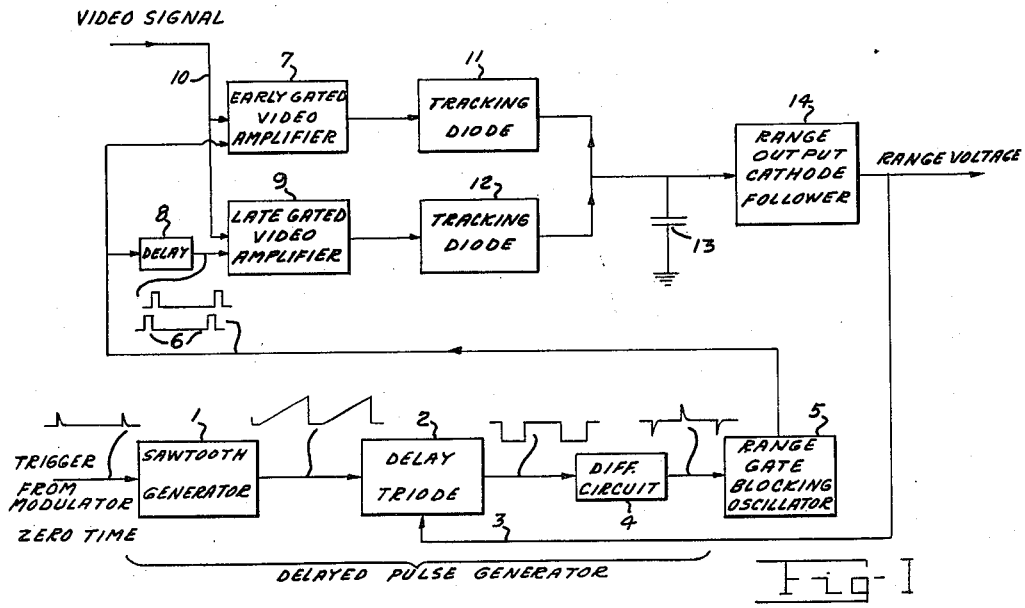
Fig-1
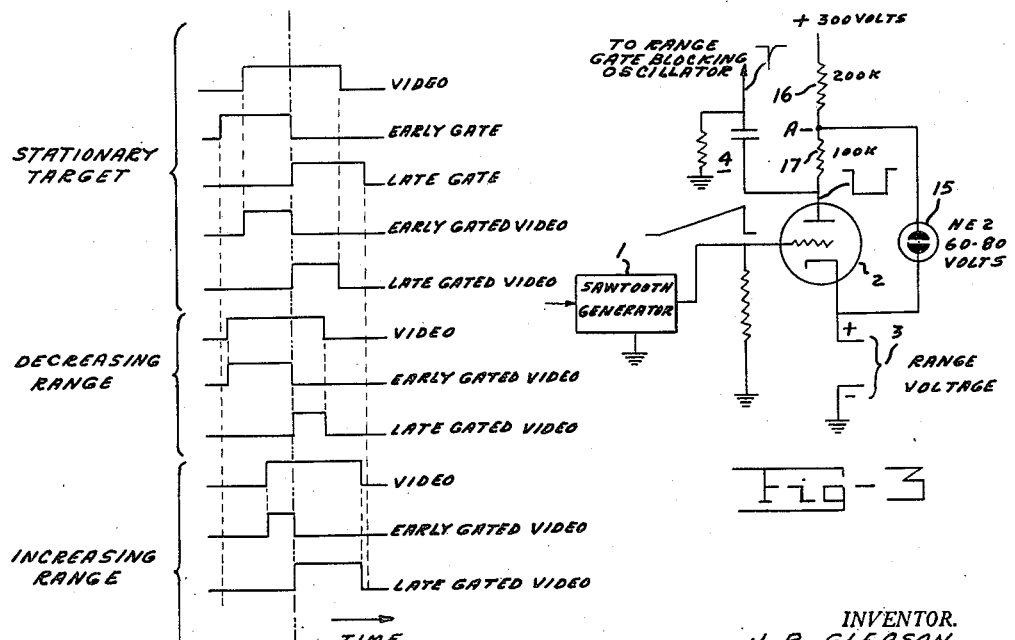
Fig-2
Fig-3
INVENTOR.
J. P. GLEASON
BY Wade Koonty
ATTORNEY
and
James S. Shannon
AGENT United States Patent Office 2,763,778
Patented Sept. 18, 1956

2,763,778

DELAYED PULSE GENERATOR

Joseph P. Gleason, Encino, Calif., assignor to the United States of America as represented by the Secretary of the Air Force Application September 15, 1955, Serial No. 534,631

4 Claims. (Cl. 250—27)

This invention relates to delayed pulse generators particularly as used in automatic range tracking circuits of radar systems. However, the generator may find utility in any situation where it is desired to generate a second pulse that follows a first pulse by a time interval that is proportional to the amplitude of a variable control voltage.

The type of delayed pulse generator to which this invention relates comprises a triode vacuum tube having a sawtooth of voltage applied to the control grid and a positive control potential applied to the cathode. The tube is normally cut off at the start of the sawtooth grid voltage but, as the grid voltage rises linearly, anode conduction eventually starts at a grid voltage determined by the value of the control potential. Therefore, by controlling the value of the control potential a control can be exerted over the time interval between the start of the sawtooth and the instant of anode conduction. The anode voltage may be differentiated to produce a negative pulse at this instant.

A delay circuit of the above type suffers from the drawback that, before conduction, the anode voltage of the tube is a function of the control potential. This means that the tube characteristics are a function of the control potential. The most important characteristics of the tube in this case is its cut-off grid voltage. If this particular characteristic is not a linear function of the control potential then the delay produced by the circuit will likewise not be a linear function of the control potential.

It is the principal object of this invention to overcome the above difficulty. Briefly, this is accomplished by connecting a gas-filled voltage regulating tube between the cathode of the triode and a point on its anode load resistor. The potential of this point is therefore substantially fixed relative to the cathode with the result that the anode-cathode voltage during cut-off is made independent of the control potential. An added advantage is also obtained from the relatively lower anode potential resulting from the use of the voltage regulating tube. Mechanical movement of the control grid due to mechanical shock or temperature changes may change the cut-off point. This effect is reduced by the lowered tube operating voltage.

A more detailed description of the invention will be given in connection with the specific embodiment thereof shown in the accompanying drawings in which, Fig. 1 shows in block form an automatic range tracking circuit utilizing the invention, Fig. 2 illustrates the operation of Fig. 1, and Fig. 3 is a schematic diagram of a delayed pulse generator in accordance with the invention.

Fig. 1 illustrates the use of the delayed pulse generator in an automatic range tracking circuit as found in certain radar systems. Synchronizing or trigger pulses, which are coincident with the radiated radar pulses, are applied to sawtooth generator 1 which operates in response to each trigger pulse to generate one sawtooth wave varying linearly with time and starting coincidently with the applied pulse. The sawtooth voltages are applied to the grid of delay triode 2 which also has a control potential applied over circuit 3 to its cathode. The tube is in cut-off at the start of each applied sawtooth and the amplitude of the control potential determines the instantaneous value of the sawtooth voltage, and hence the time after the trigger pulse, at which anode conduction occurs. The parameters are such that the tube saturates soon after conduction starts so that a substantially square wave of voltage appears on the anode. Differentiation of the leading edges of this square wave by circuit 4 produces sharp negative pulses coincident with the initiations of anode conduction in the tube. The trailing edges of the square wave produce positive pulses which coincide with the termination of the sawtooth and return of the tube to the nonconductive state.

The delayed negative pulses in the output of differentiating circuit 4 are applied to range gate blocking oscillator 5 which is triggered by each negative pulse to produce range gates 6 of duration substantially equal to the duration of a video echo signal from a single target in the field of view of the radar apparatus. The range gates are applied without delay to early gated video amplifier 7 and, after a delay in circuit 8 approximately equal to the gate pulse width, to late gated video amplifier 9. The video signal representing all targets in the field of view of the radar apparatus is applied to the inputs of both video amplifiers over circuit 10.

The purpose of the range gate in general is to isolate from the total video signal the signal representing the target to be tracked. The purpose of the early and late range gates is to sense the direction of a change in range. If the target pulse is centered relative to the range gates, i. e., if one half of the pulse is bracketed by the early gate and one half by the late gate, the outputs of the two video amplifiers are of equal duration as illustrated under "Stationary target" in Fig. 2. The outputs of these amplifiers are applied to tracking diodes 11 and 12 which are associated with condenser 13. The circuit arrangement is such that the output of early gated video amplifier 7 causes condenser 13 to discharge through tracking diode 11 while the output of late gated video amplifier 9 causes condenser 13 to charge through tracking diode 12. Consequently, with equal video outputs, the charging and discharging times are equal and there is no change in condenser voltage. If, on the other hand, the range of the target decreases, the duration of the amplifier output increases in the case of the early gated video amplifier 7 and decreases in the case of the late gated video amplifier 9, as shown under "Decreasing range" in Fig. 2. This results in a longer period of discharge than of charge and the condenser voltage therefore decreases. In a similar manner, as illustrated under "Increasing range" in Fig. 2, an increase in range results in reduced discharging time and increased charging time, which causes the condenser voltage to rise.

The voltage of condenser 13, which is proportional to range, is fed through cathode follower stage 14 and over circuit 3 to delay diode 2 where it becomes the aforementioned control potential. The effect of this potential is to increase or decrease the delay of the early and late range gates as required to keep these gates in position to equally bracket the video target pulse. Thus, an increase in range will operate, by the process described above, to increase the control potential on triode 2 and increase the delay of the range gates so as to restore the original equally bracketed relation of target pulse and range gates. Similarly, a decrease in range will cause the range gates to occur earlier to maintain this relationship.

A schematic diagram of the improved delayed pulse generator is shown in Fig. 3. The triode 2 has a sawtooth voltage from generator 1 applied to its grid and the control potential, which in the example of Fig. 1 is the range voltage, applied between cathode and ground. The circuit is initially adjusted so that, with minimum control potential (zero range) on the cathode of tube 2, anode conduction occurs when the sawtooth voltage on the grid just begins to rise. As the control potential is increased, higher values of grid voltage are required to start conduction and correspondingly greater intervals of time occur between the initiation of the sawtooth and anode conduction. The parameters, including the slope of the sawtooth, are so chosen that conduction, once started, increases rapidly to saturation so that a square wave of reasonably steep wavefront appears on the anode. Differentiation of these wavefronts by circuit 4 produces the negative pulse for triggering the range gate blocking oscillator.

Neglecting for the moment the voltage regulator tube 15, the difficulty with the above described circuit is that the control potential applied to the cathode affects the voltage between the anode and cathode of tube 2 and therefore affects the tube's characteristics, including the cut-off point. If the cut-off point does not vary linearly with anode voltage, as will be found to be more or less the case in commercial tubes, the linearity between control potential and delay is destroyed. This difficulty is overcome in accordance with the invention by dividing the anode load resistance into two parts 16 and 17 and connecting a gas-filled voltage regulator tube 15, which may be a simple neon lamp, from point A between the two resistors to the cathode. With this arrangement the potential of point A relative to the cathode is substantially fixed and independent of the value of the control potential, or range voltage, applied to the cathode. Variations in control potential therefore cannot influence the anode-cathode potential of the tube during cut-off and anode conduction will occur at the same grid-cathode potential for all values of the control potential.

What I claim is:

1. A delayed pulse generator comprising a vacuum tube having an anode, a cathode and a control grid, a source of voltage varying as a function of time, a source of adjustable direct voltage, means for applying the algebraic sum of said voltages between the grid and cathode of said tube, a circuit connected between the anode and cathode of said tube and containing in series an anode load resistor, a source of positive potential and said source of adjustable direct voltage, and means connected between an intermediate point on said load resistor and the cathode for maintaining said point at a fixed positive potential relative to said cathode.

2. A delayed pulse generator comprising a vacuum tube having an anode, a cathode and a control grid, a source of direct voltage varying as a function of time connected between said grid and a point of reference potential, a source of adjustable direct voltage connected between said cathode and said point of reference potential, an anode load resistor and a source of positive potential connected in a series between said anode and said point of reference potential, and means connected between an intermediate point on said anode load resistor and said cathode for maintaining said point at a fixed positive potential relative to said cathode.

3. Apparatus as claimed in claim 2 in which said means is a gaseous discharge tube.

4. In an automatic radar range tracking circuit of the type employing a range gate, means for delaying the range gate relative to the transmitted radar pulse, and means responsive to said range gate and the target signal for generating a range voltage and for applying said range voltage to said delay means for controlling the delay of said range gate, and in which said delay means comprises a delay triode having a voltage synchronized with said transmitted pulse and varying linearly with time applied between its grid and a point of reference potential and having said range voltage applied between its cathode and said point of reference potential and further having an anode load resistor connected between its anode and said point of reference potential, means for removing the influence of said range voltage on the value of grid-cathode voltage at which said triode passes from a non-conductive to a conductive state, said means comprising a constant potential gaseous discharge device connected between an intermediate point on said anode resistor and the cathode of said triode.

References Cited in the file of this patent

UNITED STATES PATENTS

| | | |
|---|---|---|
| 2,420,374 | Houghton | May 13, 1947 |
| 2,578,256 | MacNichol | Dec. 11, 1951 |
| 2,689,952 | Johnson et al. | Sept. 21, 1954 |